Patented Jan. 5, 1943

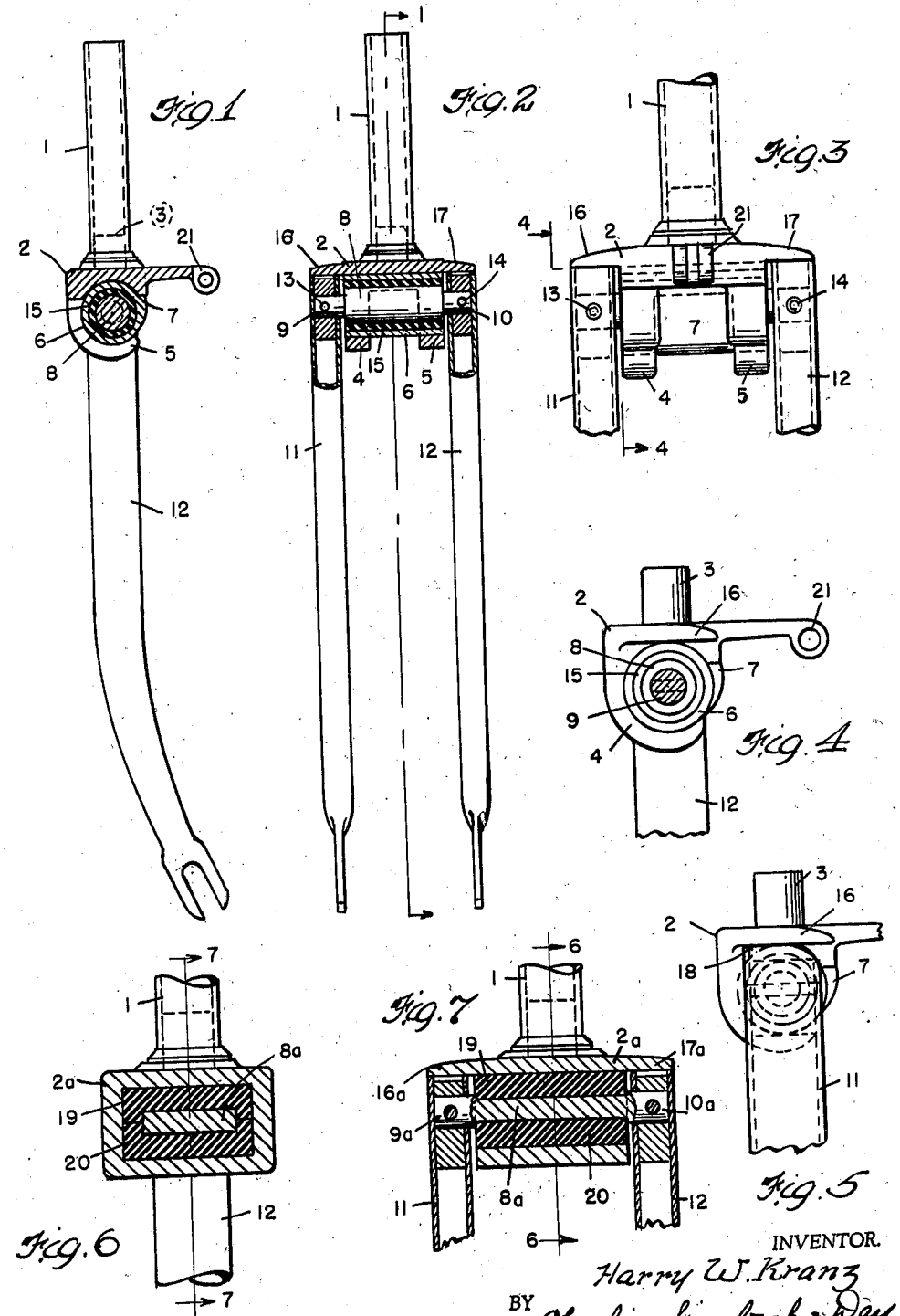

2,307,279

UNITED STATES PATENT OFFICE 2,307,279

FLOATING FORK FOR BICYCLES

Harry W. Kranz, Lakewood, Ohio, assignor to The Cleveland Welding Company, Cleveland, Ohio, a corporation of Ohio Application May 3, 1940, Serial No. 333,170

1 Claim. (Cl. 280—276)

This invention relates, as indicated, to a knee-action or "floating" fork for bicycles whereby the effects of road bumps and the like may be much lessened, ensuring both greater comfort for the rider and a longer life for the bicycle.

The chief source of discomfort to riders of bicycles has been the jarring and jolting occasioned by striking obstructions such as curbing and other irregularities in the road, the resulting shock also tending to bend the front fork. It is, therefore, a primary object of this invention to provide a device of the character described which will be effective to take up shock when the front wheel of a bicycle encounters an obstruction and absorb the jolts and jars which otherwise reach the rider.

Another object of this invention is to provide such device which shall be inexpensive to manufacture and simply assembled.

Still another object is to provide a resilient mounting for the front fork members of the bicycle which will not require servicing or readjustment.

Other objects of the invention will appear as the description proceeds.

To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:

Fig. 1 is an elevational view of one embodiment of my new fork and resilient mounting means in cross section taken along the line 1—1 on Fig. 2;

Fig. 2 is a front elevational view of such fork with a portion broken away to show the arrangement of parts of the resilient mounting means;

Fig. 3 is a fragmentary front elevational view (enlarged) of the fork brace and upper ends of the fork members;

Fig. 4 is a side view taken along the line 4—4 on Fig. 3;

Fig. 5 is a side view similar to Fig. 4, but including the near fork member;

Fig. 6 is a view taken in cross section along the line 6—6 on Fig. 7, illustrating another embodiment of my new resilient mounting means; and Fig. 7 is a sectional view of such means taken along the line 7—7 on Fig. 6.

Referring now more particularly to said drawing, and especially Figs. 1 to 5, one structure embodying my invention may comprise a tubular steering post 1 at the lower end of which is rigidly secured a fork brace 2 by means of stud 3 on said brace which is inserted in said post, the joint then being brazed or welded. Fork brace 2 carries two dependent hook-shaped arms 4 and 5 in which is journalled a tubular sleeve 6 having a stop 7 positioned to engage the forward portion of brace 2 when said sleeve is rotated in a counterclockwise direction as viewed in Fig. 1 and to pass between arms 4 and 5 when said sleeve is rotated in a clockwise direction. Passing through said sleeve is an inner pivotal cross member 8 bearing terminal studs 9 and 10 to which fork members 11 and 12 are adapted to be rigidly connected as by pins 13 and 14. Between said cross member and said sleeve and bonded thereto is disposed a body of rubber 15 adapted to yieldably resist relative rotation of said cross member and said sleeve. It is thus apparent that if sleeve 6 be held against rotation and fork members 11 and 12 be moved causing cross member 8 to rotate, such rotation will cause internal distortion of the rubber which will torsionally resist the movement. As shown in Fig. 1, stop 7 is so disposed as to engage the forward portion of fork brace 2 and prevent counterclockwise rotation of sleeve 6 beyond the position illustrated in said figure, and such fork brace also carries wing portions 16 and 17 overlying the upper ends of fork members 11 and 12 respectively. As best shown in Fig. 5, the upper ends of the fork members are rounded forwardly to permit of counterclockwise movement, as shown in such figure, but the rear portions, such as 18, act as stops engaging the under surface of said wing portions in preventing clockwise rotation, i. e. preventing rearward rotation of the fork members beyond the position illustrated in Figs. 1 and 5.

The fork of my invention is assembled as follows: Sleeve 6 with rubber 15 and cross member 8 therein is inserted in brace 2, the distance between the ends of arms 4 and 5 and the forward portion of the brace member being sufficient to permit the passage of stop 7. Cross member 8 has been so positioned in relation to sleeve 6 that the holes in studs 9 and 10 for pins 13 and 14 are disposed at right angles to the face of stop 7, i. e. parallel to the axis of the upper portions of fork members 11 and 12 when the latter are positioned as in Fig. 1 and stop 7 abuts against brace 2.

One of said studs is then seized and cross member 8 rotated 90° in a counterclockwise direction, as viewed in Fig. 1, so that the holes for pins 13 and 14 are positioned as illustrated in Fig. 2. Fork members 11 and 12 are then attached. It will now be seen that stop 7 will be held against brace 2 by the torsional stress in the rubber caused by the above described rotation of member 8. It is thus apparent that should a rider mount the bicycle, fork members 11 and 12 will tend to move toward the right as viewed in Fig. 1 and since sleeve 6 is prevented from rotation by stop 7 such movement of the fork members and resultant rotation of cross member 8 must entail further distortion of the rubber body 15, the rotation of the fork arms in this direction being only limited by the torsional stresses built up in such rubber. When a bump or other obstruction is encountered, the fork arms are thus enabled to move in a clockwise direction as viewed in Fig. 1, although only to the extent permitted by the stop ends such as 18 engaging the aforesaid wing portions of fork brace 2.

As a result of this construction a long lever arm is available between the axle of the front wheel and the fork mounting providing for sensitive response of the resilient cushioning means. Furthermore, such mounting affords no occasion for rattles or vibration, but on the contrary tends to deaden the latter. The rubber body 15 may be bonded to member 8 and sleeve 6 as by vulcanization or may be so dimensioned as to be fitted under great compression on such cross member within such sleeve.

Another embodiment of my invention is illustrated in Figs. 6 and 7 and comprises the hollow fork brace member 2a of rectangular cross section attached to steering post 1 as above described. Flat sided cross member 8a extends through said hollow brace member and fork members 11 and 12 are rigidly attached to studs 9a and 10a thereof. Said flat cross member is mounted between rubber blocks 19 and 20 which fill the space between such member and fork brace 2a. As in the previously described form of mounting, wing portions 16a and 17a are provided to act as stops, preventing backward movement of the fork members beyond a certain point. Forward movement of such members is, however, only regulated by the degree of compression of rubber blocks 19 and 20 as cross member 8a turns. Thus when a rider mounts the bicycle his weight will cause the front wheel to move slightly forward and member 8a to rotate slightly in a counterclockwise direction, as viewed in Fig. 6. When an irregularity in the road is encountered the front wheel may move back until the stops at the upper ends of the fork arms encounter wing members 16a and 17a. Forward movement of the front wheel is only limited by the degree the amount of shock is capable of compressing the rubber blocks.

Projecting forwardly from fork brace 2 is a bracket member 21 adapted to carry a spot light or the like. It will also be readily understood that other commonly employed structural features, such as truss rods and the like, may be used in conjunction with the fork of my invention.

It is readily apparent that the objects of this invention have been fully achieved and a fork for bicycles and the like provided embodying a resilient mounting effective to overcome the severe jolting and jarring to which such structure is continuously subjected.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

A shock-proof fork for bicycles and the like comprising a fork brace, a sleeve mounted therein, a pair of fork members, a cross-member rigidly connecting the upper ends of said fork members and passing through said sleeve, a body of rubber between said sleeve and said cross-member and bonded thereto, such rubber being under torsional stress tending to cause said fork members to move rearwardly, stop means on said sleeve and said fork brace operative to limit rotation of said sleeve, in one direction, and stop means on said brace adapted to engage the rear upper ends of said fork members, limiting rearward movement of said fork members relative to said fork brace, whereby said fork members may move forwardly against the torsional stress of said body of rubber to provide cushioning action of said fork members.

HARRY W. KRANZ.